No. 877,785. PATENTED JAN. 28, 1908.
W. LINHOFF.
FENDER FOR LAWN SPRINKLERS.
APPLICATION FILED JAN. 31, 1907.
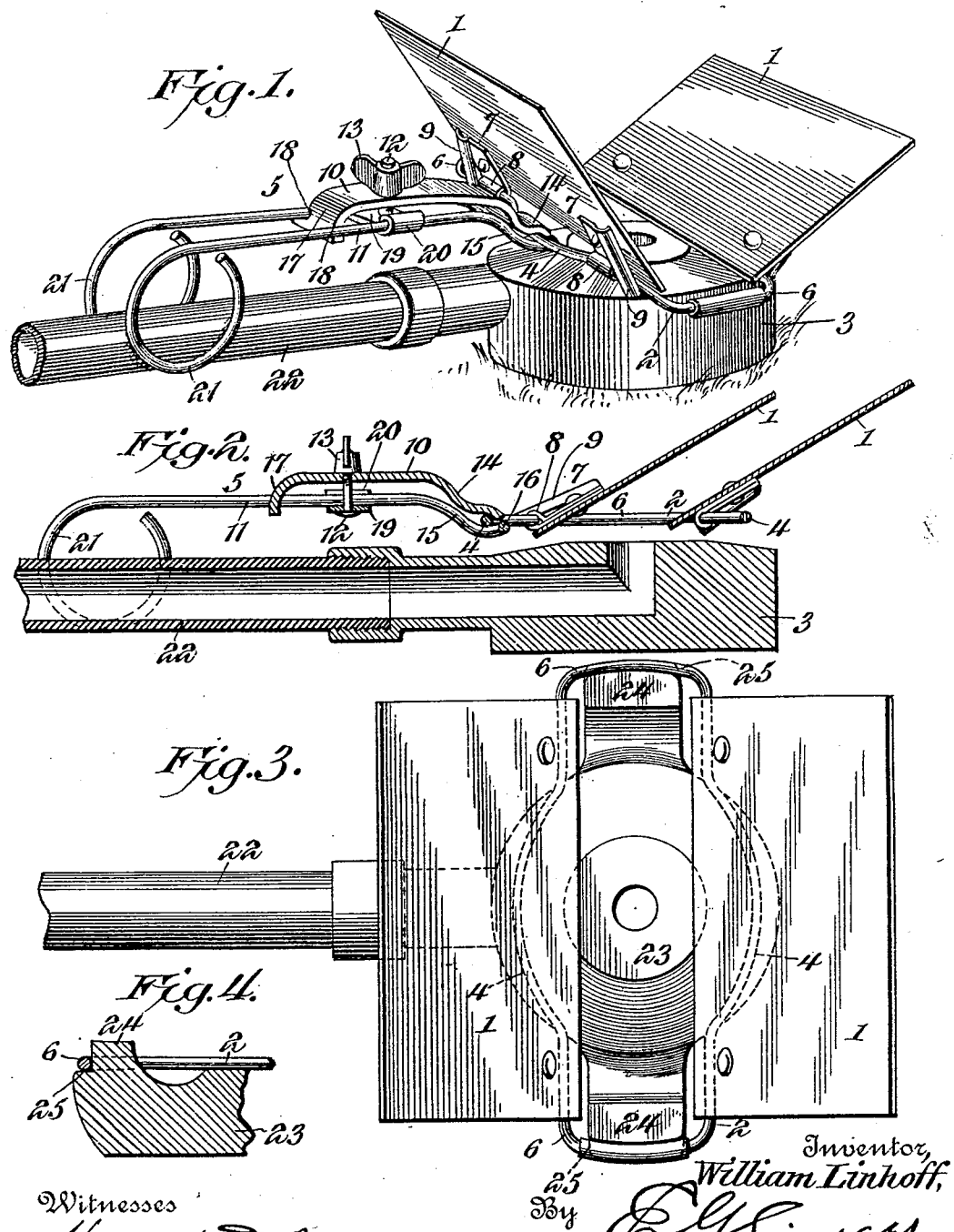
Witnesses
Howard D. Orr
H. F. Riley
Inventor,
William Linhoff,
By E. G. Siggers.
Attorney

UNITED STATES PATENT OFFICE.

WILLIAM LINHOFF, OF PASADENA, CALIFORNIA, ASSIGNOR OF ONE-HALF TO DOROTHY M. STOUT, OF BLOOMFIELD, NEW JERSEY.

FENDER FOR LAWN-SPRINKLERS.

No. 877,785.

Specification of Letters Patent.

Patented Jan. 28, 1908.

Application filed January 31, 1907. Serial No. 355,164.

*To all whom it may concern:*

Be it known that I, WILLIAM LINHOFF, a citizen of the United States, residing at Pasadena, in the county of Los Angeles and State of California, have invented a new and useful Fender for Lawn-Sprinklers, of which the following is a specification.

The invention relates to a fender for lawn sprinklers.

The object of the present invention is to provide a simple, inexpensive and efficient device, designed to be readily applied to various forms of lawn sprinklers and sprayers, and adapted to cut off the spray at one side of a sprinkler or sprayer to a greater or less degree, adjacent to side walks and analogous places, to prevent the water from discharging over, wetting and wasting on such surfaces.

A further object of the invention is to provide a fender of this character, adapted to enable sprinklers to be advantageously employed for spraying narrow strips of parking, gardens and the like, and capable of adjustment to confine the spray within the desired limit.

Another object of the invention is to provide means for adjustably mounting the fender on a sprinkler, and of enabling the former to be properly positioned with relation to the latter to secure the best results.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a fender, constructed in accordance with this invention and shown applied to a sprinkler. Fig. 2 is a longitudinal sectional view of the same. Fig. 3 is a plan view, showing the fender applied to a sprinkler having integral supporting arms for holding the fender. Fig. 4 is a detail view, illustrating the arrangement of the shoulders of the arms for supporting the frame of the fender.

Like numerals of reference designate corresponding parts in all the figures of the drawing.

1—1 designate a pair of similar blades or wings, spaced apart to permit water to be discharged between them, and hinged to a substantially oblong frame or support 2, and adapted to be adjusted independently of each other and to be raised or lowered to cut off a portion of the spray of a sprinkler 3, or to confine such spray within the desired limits. The oblong frame, which is composed of two sides and connecting ends, has its side portions bowed outwardly at the center at 4 to project such bowed or outwardly curved portions 4 beyond the hinged edges of the blades or wings to facilitate the attachment of the frame 2 to a clamp 5, which is adapted to detachably secure the fender to the sprinkler. The oppositely bowed portions 4, form a substantially circular central portion and provide, at the center of the frame, an enlarged open portion, through which the water from the sprinkler is discharged. The end portions 6 of the frame 2 are extended beyond the ends of the sides or wings, and are bowed slightly to enable them to be engaged by the clamp 5, which is adapted to be connected to either side or end of the frame and which adjustably receives the same, whereby the device is susceptible of attachment to a large variety of sprinklers and sprayers.

The blades or wings, which are constructed of sheet metal, or other suitable material, may be rectangular, or any other preferred shape, and they are provided at their lower edges with hinge elements 7, having eyes 8 to receive the sides of the frame 2 at the terminals of the central bowed portions 4, whereby the sides or wings are hinged to the frame. The frame is constructed of round wire, or other suitable material, and it provides pintles or pivot portions, on which the blades or wings swing. The hinge elements 7, which may be formed by doubling plates or pieces of sheet metal, or other material, are provided with integral springs 9, bowed or corrugated longitudinally to stiffen them and having projecting portions, which frictionally engage the sides of the frame 2, whereby the blades or wings are secured in their adjustment. The hinged wings or members 1 are adapted to be readily swung upwardly and downwardly, and the springs operate automatically to hold the said wings or members against accidental movement, and they have sufficient power to withstand the force of the spray. The springs 9 are substantially semicylindrical, and the frame is engaged by the side edges of the springs.

The sprinkler 3, which has a substantially cylindrical head or nozzle, is provided at the top with a discharge opening, and the blades or wings, which are supported above the head or nozzle at opposite sides of the discharge opening, are independently adjustable and either or both may be raised, and when one is raised and the other lowered to a horizontal position, the spray will be cut off at one side. This will enable the sprinkler to be arranged close to a walk, or similar place, without wasting the water on the same. When both of the blades or wings are swung upward, the spray will be constricted or cut off at opposite sides and may be confined within the desired limits. This will enable narrow strips of parking, and similar places to be advantageously sprayed, without wasting the water on the adjacent paved portions of a street, or the like. The blades or wings are also adapted to be arranged in substantial parallelism and at an inclination, as illustrated in Fig. 2 of the drawing, for throwing the spray in any desired direction, and they may be converged to operate in the nature of a nozzle.

The clamp is composed of an upper plate or member 10 and a lower member 11, constructed of stout spring wire, or other resilient material, which is adjustably connected with the upper plate or member by means of a bolt 12 and a winged nut 13. The upper plate or member is provided with a jaw 14, which extends downwardly and forwardly at an inclination to coöperate with a correspondingly shaped jaw 15 of the other member 11 in clamping the frame 2, as clearly illustrated in Figs. 1 and 2 of the drawing. The member 11 is composed of two sides and a connecting transverse portion 16, and the engaging portions of the jaws are oppositely curved to present concave faces to the frame 2, and to enable the latter to be securely confined in the clamp. The clamp also forms a hinged connection for the frame to enable the latter to be swung upwardly and downwardly, to position it properly with relation to the sprinkler. The inclination of the jaws afford an adjustment for the fender, and enables the same to be raised and lowered by arranging it at different points along the inclined jaws.

The rear end of the plate or upper member 10 is curved downward between the sides of the other member 11, and the downwardly curved portion 17 is provided at its opposite edges with notches 18 to receive the sides of the lower member 11, whereby the upper plate or member is fulcrumed on the lower member, and it is adapted to operate in the nature of a lever for clamping the frame 2.

The sides of the lower member 11 are retained in the notches 18 of the upper plate or member by means of a transversely disposed connecting plate 19, extending across the member 11 in advance of the downwardly curved portion 17 and having upturned inwardly curved ends 20, which partially embrace the sides of the member 11, as clearly shown in Fig. 1 of the drawing. The transversely disposed connecting plate or member is provided with a central perforation for the reception of the bolt 12, which has a head at its lower end to engage the plate 19, and the upper threaded portion of the bolt is engaged by the nut 13, which bears against the upper face of the plate or member 10. By tightening the nut, the frame 2 may be tightly clamped between the jaws 14 and 15.

The inner or rear end portions of the sides of the lower member 11 of the clamp are coiled to form circular clamping loops 21, which are resilient, the resiliency being increased by leaving the terminals of the wires free. The clamping loops are adapted to engage the opposite sides of a hose 22, or other tubular connection with the sprayer, and it will support the fender in the desired position above the discharge opening of the sprinkler. The resilient clamping loops are adapted to engage the hose 22 at any desired point, and the clamp enables the fender to be moved backwardly or forwardly, and it also permits the fender to be instantly attached to and removed from the sprinkler.

The clamp will enable the fender to be applied to various forms of sprinklers and sprayers, but the frame 2 may also be directly applied to a sprayer or sprinkler 23, without the aid of the clamp. The sprayer 23 is provided at opposite sides with upwardly extending arms 24, having reduced terminals to receive the ends of the frame, which is supported upon the shoulders 25, formed by reducing the ends of the arms 24. The curving and bowing of the frame 2 renders it sufficiently resilient to frictionally engage, and thereby positively clamp, the arms 24, so that the fender will be securely retained on the sprinkler 23.

Having thus fully described my invention, what I claim as new and desire to secure by Letters Patent, is:—

1. The combination with a sprinkler, of a fender provided with a pair of independently adjustable sides or wings located beyond the discharge orifice of the sprinkler and spaced apart to permit the water to be discharged between them and movable toward and from each other to arrange them in parallelism or at an acute or obtuse angle to each other.

2. The combination with a sprinkler provided at the top with a discharge opening, of a fender having a pair of independently adjustable hinged blades or wings located above the sprinkler and arranged to swing upwardly and downwardly and movable toward and from each other to arrange them in parallelism or at an acute or obtuse angle.

3. A fender for sprinklers comprising supporting means having spaced pintle portions, a pair of blades or wings hinged to the pintle portions and capable of independent adjustment, and means carried by the blades or wings for automatically engaging the support to hold the blades or wings in their adjusted position.

4. A fender for sprinklers comprising supporting means having spaced pintle portions, a pair of blades or wings hinged to the pintle portions and capable of independent adjustment, and springs mounted on the blades or wings and engaging the supports for holding the wings in their adjustment.

5. A fender for sprinklers comprising a support having opposite pintles, and independently adjustable blades or wings provided with hinge elements mounted on the pintles of the support and provided with resilient portions forming springs and engaging the pintles for holding the blades or wings in their adjustment.

6. A fender for sprinklers comprising a support having pintles, blades or wings, and hinge elements carried by the blades or wings and mounted on the pintles of the support and provided with resilient portions or springs engaging the support and corrugated longitudinally.

7. The combination with a sprinkler, of a fender comprising a substantially oblong frame spaced from the discharge orifice of the sprinkler, blades or wings hinged to the frame at opposite sides of the discharge orifice of the sprinkler and located in advance of the same and spaced apart to permit water to pass between them, said blades or wings being movable toward and from each other to arrange them either in parallelism or at an acute or obtuse angle to each other, and means for mounting the frame on the sprinkler.

8. A fender for sprinklers comprising a frame having sides and ends, blades or wings mounted on the frame at opposite sides thereof, and a clamp having means for engaging the frame at either side or end, said clamp being also provided with means for engaging a sprinkler.

9. A fender for sprinklers comprising blades or wings, a clamp provided at one end with jaws for engaging a sprinkler and having jaws at the other end, and means engaged by the latter jaws for supporting the blades in advance of the discharge orifice of the sprinkler.

10. A fender for sprinklers comprising blades or wings, a clamp provided with substantially parallel sides having their inner ends bent downwardly and coiled to form substantially parallel loops for engaging a sprayer, said clamp being also provided in advance of the loops with front jaws, and means engaged by the latter for supporting the blades or wings in spaced relation in advance of the discharge orifice of the sprayer.

11. A fender for sprinklers comprising a support, blades or wings mounted on the support, and a clamp having hose-engaging jaws and provided also with means for adjustably engaging the support.

12. A fender for sprinklers comprising a support having sides and ends, blades or wings mounted on the support, and a clamp provided with means for engaging a sprinkler and having jaws for engaging either side or end of the support.

13. A fender for sprinklers comprising a frame having sides and ends, blades or wings mounted on the frame, and a clamp having means for adjustably and hingedly connecting either side or end of the support to it.

14. A fender for sprinklers comprising a support, blades or wings mounted on the support, and a clamp having inclined jaws adjustably receiving the support.

15. A fender for sprinklers comprising a substantially oblong frame having bowed sides and ends, blades or wings mounted on the sides of the frame, and a clamp provided with jaws for engaging either side or end of the frame.

16. A fender for sprinklers comprising a support, a clamp composed of a lower member having spaced sides and provided with a clamping jaw, an upper member having a coöperating jaw and provided with a portion extending between and interlocked with the said spaced sides, and means for adjustably connecting the members for holding their jaws in engagement with the support, and means carried by the support for deflecting the spray.

17. A fender for sprinklers comprising a support, a clamp composed of a lower member having spaced sides and provided with a jaw, an upper member having a jaw to coöperate with that of the lower member and provided with a portion extending between and engaging the said spaced sides, means for connecting the sides, and an adjusting device connecting the upper member with the said connecting means, and means carried by the support for deflecting the spray.

18. A fender for sprinklers comprising a port, blades or wings carried by the same, and a clamp composed of two members having jaws for engaging the support, one of the said members being provided with spaced sides, which are coiled to form hose-engaging jaws.

In testimony, that I claim the foregoing as my own, I have hereto affixed my signature in the presence of two witnesses.

WILLIAM LINHOFF.

Witnesses:
George P. Cary,
Fred R. Emery.